United States Patent [19]

Ernst et al.

[11] 4,108,504
[45] Aug. 22, 1978

[54] RACEWAY FOR LONGITUDINALLY MOVABLE ROLLING ELEMENT BUSHING

[75] Inventors: Horst Manfred Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 809,209

[22] Filed: Jun. 23, 1977

[30] Foreign Application Priority Data

Jul. 15, 1976 [DE] Fed. Rep. of Germany ....... 2631808

[51] Int. Cl.² .............................................. F16C 29/06
[52] U.S. Cl. .................................................. 308/6 C
[58] Field of Search .................. 308/6 C, 6 B, 185

[56] References Cited

U.S. PATENT DOCUMENTS

| | | | |
|---|---|---|---|
| 3,545,826 | 12/1970 | Magee et al. | 308/6 C |
| 3,900,233 | 8/1975 | Thomson | 308/6 C |
| 3,951,473 | 4/1976 | Olschewski et al. | 308/6 C |

*Primary Examiner*—Trygve M. Blix
*Assistant Examiner*—Charles E. Frankfort
*Attorney, Agent, or Firm*—Daniel M. Rosen

[57] ABSTRACT

A longitudinally movable bushing has a continuous raceway for endlessly circulating rolling elements, such as balls. The raceway has a portion for loaded balls, wherein the balls are externally exposed to engage a loading surface, and an unloaded portion joined at its ends to the loaded portion. The ends of the loaded raceway portion gradually widen, the widened portions having the same depth as the remainder of the portions.

6 Claims, 3 Drawing Figures

RACEWAY FOR LONGITUDINALLY MOVABLE ROLLING ELEMENT BUSHING

BACKGROUND OF THE DISCLOSURE

This invention relates to longitudinally movable bearing structures having raceways for guiding or continuously circulating rolling elements, such as balls. The invention is particularly directed to the provision of raceways for such bearing structures, for avoiding problems arising by the passage of the rolling elements to the loaded portions of the raceways. While the invention is particularly disclosed with reference to ball bushings adapted for longitudinal movement relative to a shaft, it will be apparent that the invention can be adapted for other uses.

In ball bushings of one type, adapted for longitudinal movement relative to a cylindrical shaft, the bushing is comprised of a housing or casing structure surrounding the shaft and defining raceways for the balls. The raceways have longitudinally extending portions with radially inwardly open slots, for balls under load engaging the shaft, and longitudinally extending raceways separated from the shaft for balls not under load, and generally semicircular end sections interconnecting the ends of the two longitudinally extending portions.

Bushing structures of this type are well known. In one form of bushing of this type, the ends of the raceway portions for the balls under load are provided with conical shapes, intended to guide the balls from the unloaded raceway portions into the loaded raceway portions without restraints. This structure has been found to have the disadvantage, however, that unloaded balls, upon entering the loaded section of the raceway, strike against the edges of the raceways at the same time that they are placed under load. This results from the fact that unavoidable tolerances, for example, due to manufacturing, result in small displacements of the raceways in the loaded and unloaded portions thereof. As a result, a damaging stick-slip movement of the balls occurs, with consequent blocking of the balls and the production of undesirable running noise of the balls in the raceways. Further, since the ends of the raceways are conical, the balls in this region are not under load, whereby the stiffness of the machine structure is decreased, as well as the load capacity of the bushing.

The present invention is thereby directed to the provision of a bearing structure of the above type in which the rolling elements may run in their respective raceways without a damaging stick-slip movement, and wherein the load capacities of the bearing structures may be increased, with consequent noise reduction.

SUMMARY OF THE INVENTION

Briefly stated, in accordance with the invention, a ball bushing is provided in which each end of the raceway portion under load is gradually outwardly widened in the axial direction, with the distance from the bottom of these widened portions of the raceway remaining the same distance from the axis of the shaft as the distance between the center of the loaded raceway portion and the axis of the shaft. As a consequence, balls entering the loaded portion of the raceway are radially loaded initially without being laterally guided by the edges of the raceway. As a consequence, the damaging effect on the structure caused by simultaneous application of loads and striking the edges of the raceway, and the consequent stick-slip movement of the balls, is limited. Once the ball has entered the raceway and been radially loaded, the balls then are guided to the middle of the respective raceway for balls under load. As above discussed, displacement of the centers of the raceways for the balls under load and the raceways leading to this portion of the structure are caused by unavoidable tolerances arising during manufacture.

In the arrangement of the invention, the balls may thereby be guided by the widened portions of the raceway in a slip-free manner, into the centers of the raceway portion for balls under load.

According to further features of the invention, the raceways for balls under load may be in the form of inserts, such as steel inserts, snapped into a casing, or they may be formed, for example, by stamping or milling, in the housing itself.

BRIEF DESCRIPTION OF THE FIGURES

In order that the invention will be more clearly understood, it will now be disclosed in greater detail with reference to the accompanying drawings, wherein.

DETAILED DESCRIPTION OF THE INVENTION

Figure 1:
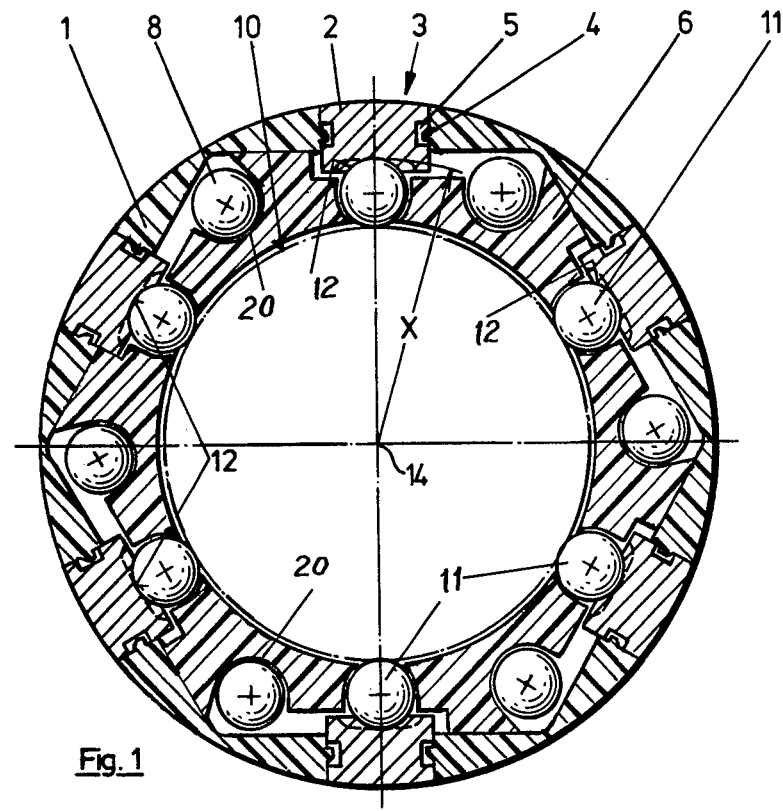
FIG. 1 is a cross-sectional view of a ball bushing structure according to the invention, taken generally centrally axially of the bushing.

Referring now to the drawings, and more particularly to FIG. 1, therein is illustrated a ball bushing structure according to a preferred embodiment of the invention, and including an axially extending casing 1 of, for example, an elastic material such as plastic. The casing 1, may be built into a boring in a housing (not shown) or other structure, the details of the external portions of the structure being not of importance with respect to the present invention.

The casing 1, as illustrated in FIG. 1, is provided with longitudinally extending slot 3, and a rail 2 is fitted into each of these slots. The rails 2 are preferably of a metal material, such as steel and form the bottoms of the raceways for the portions thereof under load. In order to hold the rails in position the sides of the slot 3 may be provided with longitudinally extending noses or ridges 4 which engage matching recesses 5 extending along the sides of the rails 2. The noses or ridges 4 thereby inhibit the falling of the rails 2 out of the respective slots in the casing.

A cage 6, which is also preferably of a plastic material, is close fit within the boring of the casing 1. As is evident from FIG. 1, the casing 1 and cage 6 define a plurality of longitudinally extending raceway portions 20 equally separated and distributed about the bushing, for holding balls away from the shaft 10 upon which the bushing is adapted to be mounted. The shaft 10 is indicated generally by dash-dot lines in FIG. 1.

As further indicated in FIG. 1, the rails 2 define longitudinally extending raceways 12 for the balls under load, these raceways being open radially inwardly to enable the balls under load to engage the shaft 10. The cage 6 may extend into close proximity with this raceway portion, for example, to hold the balls if the bushing structure is separated from the shaft. In accordance with conventional structures, each raceway portion for balls under load is interconnected at its ends with a corresponding return raceway portion 20 for unloaded balls, and for this purpose semicircular raceway portions are generally provided. Such semicircular end portions are generally indicated by the schematic diagram of FIG. 2, and may be formed in the casing structure, or in caps adapted to be fitted and held onto the casing. This arrangement is conventional, however, and does not form a part of the invention.

Figure 2:
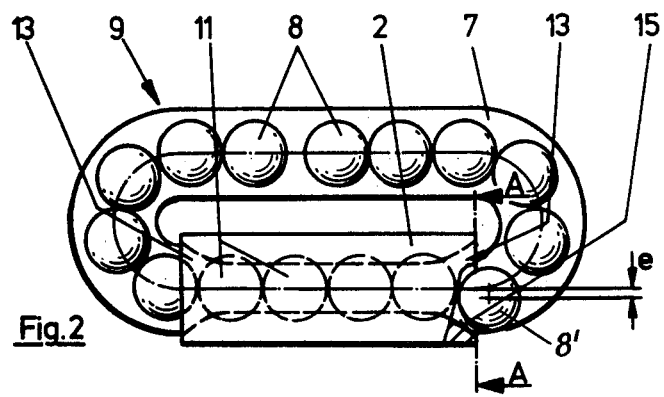
FIG. 2 is a schematic layout of the raceway for a ball bushing in accordance with the invention, showing the paths for the balls under load and the unloaded balls, as well as the shape of the lead-in portions of the raceways for the balls under load.

Thus, as illustrated in FIGS. 1 and 2, balls 8 not under load circulate in the portions 20 of the raceway, whereas balls 11 under load circulate in the raceway portions 12 under load. The end portions 7 of the raceways, which may be formed by the semicircular end portions thereof, direct the balls towards and away from the portion 12 of the raceway for balls under load.

Figure 3:
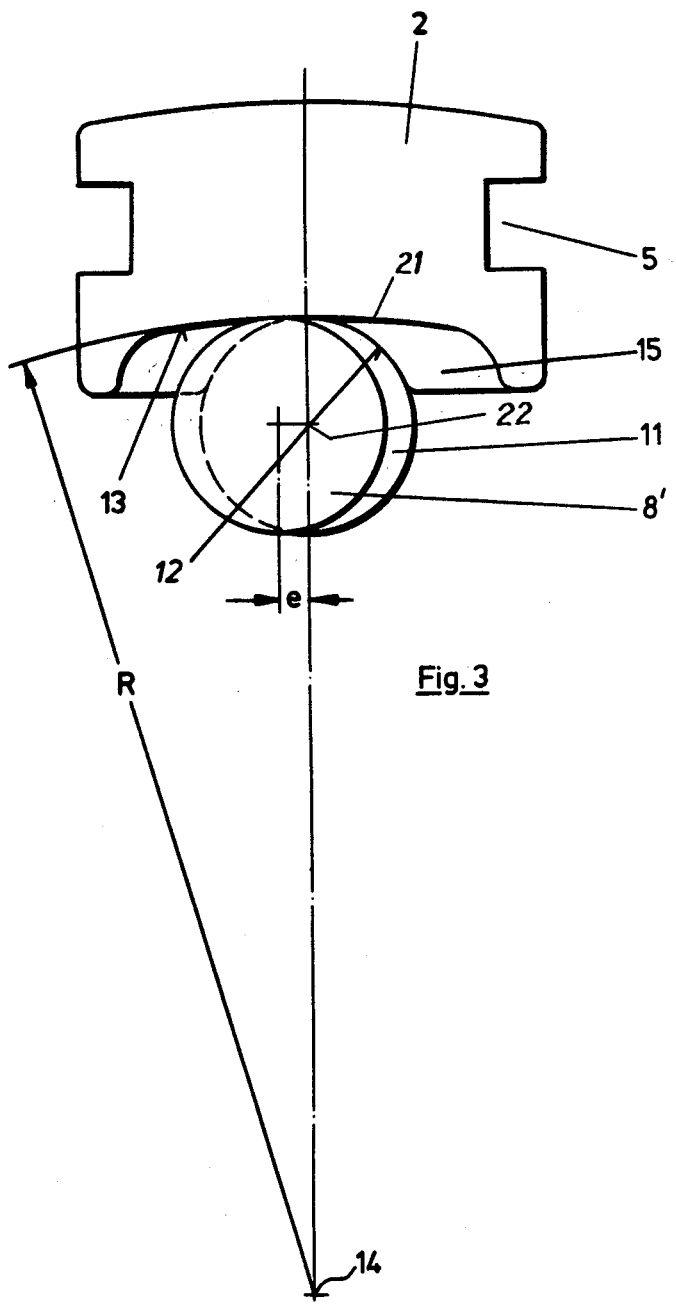
FIG. 3 is an enlarged view of the end of a raceway portion for balls under load, at the position generally indicated by the lines A—A of FIG. 2, and showing the alignment of the balls at this position.

As indicated in FIGS. 2 and 3, in accordance with the invention, the portions 13 of the raceways 12 for balls under load are gradually widened, toward the axial ends of the these raceway portions. The widened portions 13 of the raceways 12 have raceway bottoms 21 which are at the same distance from the axis 14 of the shaft, as shown in FIG. 3, as the distance X between the bottom of the center portions of the raceways and the center 14 of the shaft as indicated in FIG. 1.

As shown more clearly in FIGS. 2 and 3, wherein a ball 8′ not under load is shown as it just enters the raceway portion 12, the ball 8′ is immediately loaded, since the bottom 21 of the widened raceway portion is at the same distance from the axis of the shaft as the center portions of this raceway section. Initially, however, the ball 8′ does not engage the sides 15 of the widened raceway portion. As further indicated in FIG. 3, the ball 8′ initially entering the raceway portion 12 for balls under load may be displaced, with respect to the center 22 of this raceway portion, by a distance e. The distance e represents a manufacturing tolerance, that is, it is not designed into the structure and results from unavoidable errors. In the further passage of the ball 8′ into the raceway portion 12 for balls under load, the now loaded ball will eventually engage the gradually narrowing sides 15 of this raceway portion, and be guided to the position indicated by the balls 11 in FIGS. 1–3. As a consequence, the balls are orderly loaded and directed in a slip-free manner to roll into the raceway portions 12.

It is, of course, apparent that the widened raceway portion 13 is provided at both ends of the raceway 12, since the balls may enter the raceway portion 12 from either end, depending upon the relative direction of movement between the shaft 10 and the bushing.

While the invention has been described with particular reference to a type of bushing structure wherein the raceway portions 12 for balls under load are defined by separate rail elements 2 snapped into a casing, and having grooves on their inner surfaces defining the raceways, it is evident that the raceway portions 12 of the above disclosed configuration may also be formed directly in a casing, in which case the entire casing is preferably made of steel or the like. In this case, of course, the separate rails 2 are omitted, and the shape of the raceway portion 12 with widened ends 13 is directly formed in the bore of a suitable casing.

The arrangement of the invention thereby provides the advantage that, in spite of inaccuracies in the bushing caused, for example, by manufacturing tolerances, wherein the centers of the raceway portions 7 are displaced with respect to the centers of the raceway portions 12 for the balls under load, the damaging contact abrasion of the balls into the raceway portions under load is avoided. Consequently, a bushing in accordance with the invention has increased load capacity, since the raceway portions 12 for balls under load extend for a longer distance with respect to the length of the bushing, that is, due to the fact that the transition portions 13 of these raceway portions can now effectively be employed to guide loaded balls. Further, the bushing structure, in accordance with the invention, results in the generation of less noise than previous structures.

While the invention has been disclosed and described with reference to a limited number of embodiments, it will be apparent that variations and modifications may be made therein, and it is therefore intended in the following claims to cover each such variation and modification as falls within the true spirit and scope of the invention.

What is claimed is:

1. In a bushing adapted for linear movement and including housing means defining at least one path for guiding rolling elements, wherein said path has a raceway portion along which said rolling elements are exposed to loads and a return raceway portion for unloaded rolling elements and joining both ends of said loaded raceway portion, the improvement wherein the ends of said loaded raceway portion have gradually increasing widths away from the longitudinal center portion thereof, but have the same depth, whereby rolling elements entering said loaded raceway portion are subjected to loading prior to being guided laterally by the side walls of said loaded raceway portion.

2. In a ball bushing adapted for longitudinal movement with respect to a cylindrical shaft, and having a casing means at least partially surrounding said shaft and defining a raceway for an endless row of balls, said raceway having a first axially extending portion for balls under load with a radially inwardly opening slot for guiding balls in rolling contact with said shaft, and a second portion for unloaded balls joining both ends of said first portion and guiding said balls out of contact with said shaft, the improvement wherein said first portion of said raceway has gradually increasing widths at each axial end thereof, the distance between the bottom of said first portion of said raceway at each axial end thereof from the axis of said shaft being the same as the distance between the bottom of the axial center of said first portion and the axis of said shaft, whereby balls entering said first raceway portion are subjected to radial loading prior to lateral shifting and centering by the side walls of said first raceway portion.

3. The ball bushing of claim 2, wherein said casing means comprises a casing defining raceway portions for unloaded balls, said casing having longitudinally extending slots, said casing means further comprising longitudinally extending inserts snapped into said slots for defining said first axially extending portions of said raceways.

4. The ball bushing of claim 3, wherein said inserts are of metal.

5. The ball bushing of claim 3, wherein said casing is of a plastic material, and further comprising a cage closely fit within said casing, said cage being of a plastic material.

6. The ball bushing of claim 2, wherein said first axially extending portion of said raceway is formed in said casing means.

* * * * *